United States Patent [19]

Myers et al.

[11] 4,105,261

[45] Aug. 8, 1978

[54] SPHERICAL BEARING

[75] Inventors: William N. Myers, Huntsville, Ala.; Leopold A. Hein, Fayetteville, Tenn.

[73] Assignee: The United States of America as represented by the Administrator of the National Aeronautics and Space Administration, Washington, D.C.

[21] Appl. No.: 736,909

[22] Filed: Oct. 29, 1976

[51] Int. Cl.² ............................................ F16C 23/08
[52] U.S. Cl. ...................................... 308/72; 308/194
[58] Field of Search .......................... 308/72, 74, 194; 29/149.5 B

[56] References Cited

U.S. PATENT DOCUMENTS

| 3,179,477 | 4/1965 | Carter | 308/72 |
| 3,268,983 | 8/1966 | Straub | 308/72 X |
| 3,382,015 | 5/1968 | Steidl | 308/22 |
| 3,655,249 | 4/1972 | Abel | 308/72 |
| 3,989,323 | 11/1976 | Lambert | 308/74 |

FOREIGN PATENT DOCUMENTS 1,284,175 11/1968 Fed. Rep. of Germany ............ 308/72

Primary Examiner—Robert B. Reeves
Assistant Examiner—Edward M. Wacyra
Attorney, Agent, or Firm—J. H. Beumer; J. R. Manning; L. D. Wofford, Jr.

[57] ABSTRACT

A spherical bearing including an inner ball having an opening for receiving a shaft and a spherical outer surface. A circular outer race including a plurality of circumferentially spaced sections extending around the inner ball for snugly receiving the inner ball. A groove extends circumferentially around the race producing a thin wall portion therebelow which permits the opposed side portions to flex relative to the ball for maximizing the physical contact between the inner surface of the race and the spherical outer surface of the ball.

6 Claims, 14 Drawing Figures

SPHERICAL BEARING

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The present invention relates to a spherical bearing and more particularly to a spherical bearing which includes a race constructed of a plurality of segments that is permitted to flex to conform to the shape of an inner ball.

Heretofore, spherical bearings have been utilized for supporting rods and the like which are subjected to substantial vibrations. As a result of continuous vibration, play developed between the spherical bearing and the race. Normally, the spherical bearings are load carrying components. When working in an environment wherein the bearings encounter substantial vibrations one of the more important aspects of the design of the bearing is to insure that the unit loading (hertz pressure) does not exceed certain values. These values are governed by the properties of the materials in contact, the lubrication utilized, and the heat generated.

In other words, it is desirable to maintain as much surface contact between the ball and race as possible so as to minimizing pounding (brinelling). Theoretically in curved spherical bearings there is only a line contact between the ball and the race. As a result this poor contact causes the ball to pound and gall in vibration causing the joint to become loose. This looseness can also develop in the manufacturing of the ball and the race as a result of poor tolerances.

Examples of spherical bearings are disclosed in U.S. Pat. No. 3,627,389, 3,243,212, 3,711,171 3,934,954, 3,666,331, and 3,382,015. All of these patents disclose spherical bearings which include a ball and race, however, none of which disclose the complete combination taught by applicant.

SUMMARY OF THE INVENTION

The invention includes a spherical bearing comprising an inner ball having an opening for receiving a shaft and a shperical outer surface. A circular outer race defined by a plurality of circumferentially spaced sections encircles the inner ball and holds such snugly therein. A groove extends circumferentially around the race for defining a thin wall portion therebelow which permits flexing of the outer edges of the race relative to the ball for maximizing the physical contact between the inner surface of the race and the spherical outer surface of the ball. The bearing is carried within a pillow block which has an opening therein that corresponds to the outer surface of the race. In one particular embodiment the outer surface of the race and the inner surface of the pillow block are chamfered so as to prevent movement therebetween.

Accordingly, it is an important object of the present invention to provide a bearing wherein close tolerances are maintained between the race and ball even when exposed to vibrations.

Another important object of the present invention is to provide an bearing which minimizes the transfer of vibrations through a pillow block and a shaft extending therethrough to objects loaded on the shaft.

Still another important object of the present invention is to provide a spherical bearing that is free of lash or play which can be used in applications where vibrations are present or extreme accuracy is required.

Still another important object of the present invention is to provide a spherical bearing which includes a race that is relatively flexible, so as to maximize the surface contact between the ball and the inner surface of the race under changing stress conditions.

These and other objects and advantages of the invention will become apparent upon reference to the following specification, attendant claims and drawings.

DESCRIPTION OF A PREFERRED EMBODIMENT

Figure 1:
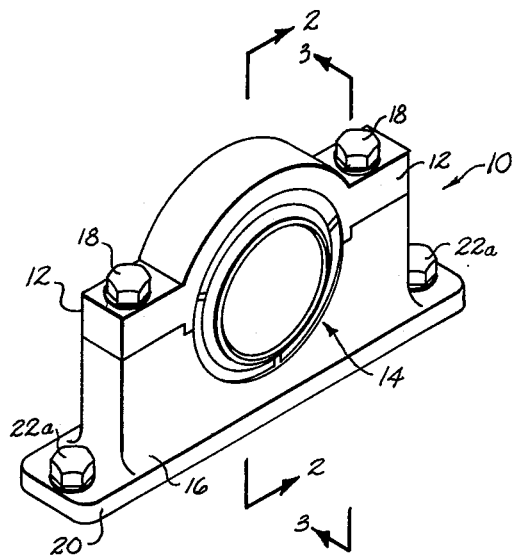
FIG. 1 is a perspective view illustrating a bearing assembly including a pillow block and a spherical bearing constructed in accordance with the present invention.
Figure 2:
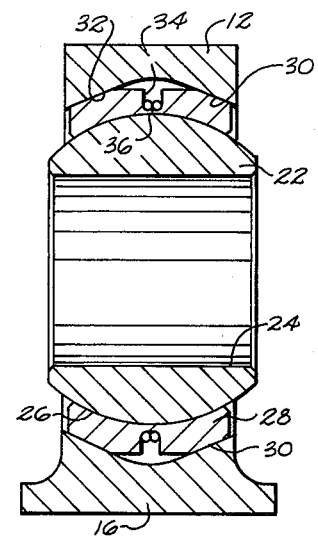
FIG. 2 is a sectional view taken along the line 2—2 of FIG. 1.

Referring in more detail to FIG. 1 of the drawings there is illustrated a pillow block generally designated by rhe reference character 10, which is constructed of two pieces. An upper clamping member 12 extends over and partially around the bearing assembly, generally designated by the reference character 14 and is secured to a base member 16 by means of the bolts 18. The base member has outwardly extending flanges 20 through which bolts 22a pass for securing the pillow block to any suitable device.

The spherical bearing 14 includes a ball 22 which has a cylindrical bore 24 extending therethrough. The outer surface 26 of the ball 22 is spherical and mates with an inner surface of a race 28. The outer edges 30 and 32 of the race 28 are chamfered. A circumferential groove 34 extends around the race for defining a thin wall portion 36 closely adjacent the inner ball 22. The thin wall portion being substantially less than ½ the thickness of the race. As a result of the wall being thin at 36 the inner portions of the race are permitted to flex so as to conform to the outer surface of the ball for maintaining a snug fit therebetween.

Figure 3:
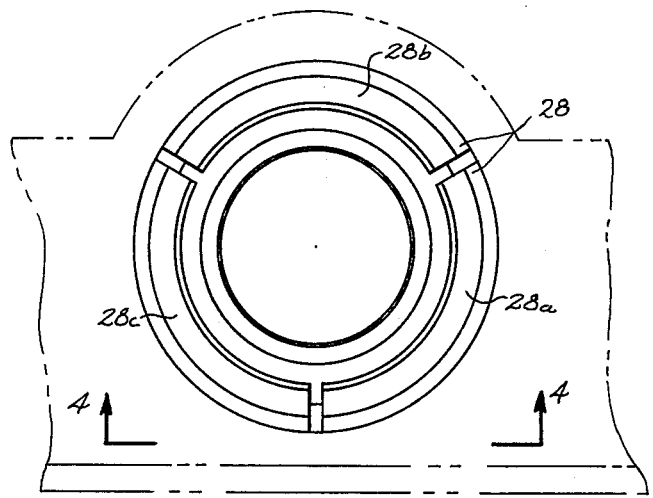
FIG. 3 is an enlarged sectional viewtaken along line 3—3 of FIG. 1.
Figure 4:
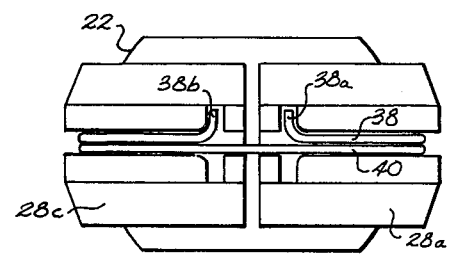
FIG. 4 is a plan view taken from the bottom along line 4—4 of FIG. 3 showing the spherical bearing of FIGS. 1 through 3, FIGS. 5 through 7 are partial longitudinal cross sections with parts broken away illustrating various modified forms of the invention.

As better seen in FIG. 3, the race 28 is constructed of three circumferentially spaced segments identified by the reference character 28a, 28b and 28c. These three segments or sections are held together by means of a pair of wires 38 and 40 which extend through the circumferential groove 36. The ends 38a and 38b of the wire 38 extend into laterally extending slots for securing the three sections 28a, 28b and 28c together. The wire 40 also has laterally extending ends provided on the other side of the spherical bearings as illustrated in FIG. 4 for aiding in securing the three sections together. The purpose of providing the circumferential groove in the race is to permit flexing of the sides of the race to maintain a constant contact between the inner surface of the race and the outer surface of the spherical ball. It is substantially impossible to make the curvature of the outer surface of the ball 22 and inner surface of the sections of the race 28 identical, and as a result, the flexing of the race 28 compensates for the irregularities between the two curvatures.

The inner surface of the pillow block and the outer surface of the race as indicated at 30 and 32, are chamfered so as to prevent the bearing from moving laterally in the pillow block.

Figure 5:
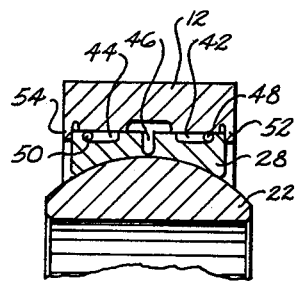
Figure 6:
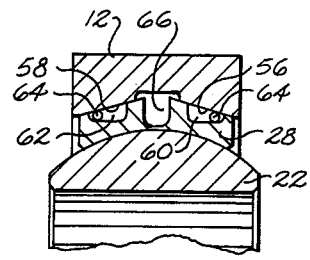
Figure 7:
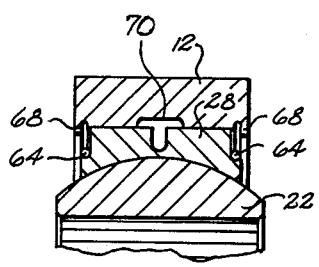

FIGS. 5, 6 and 7 illustrate three modified forms of the invention and in particular, different methods of mating the outer race with the pillow block. As shown in FIG. 5, the race 28 has a pair of grooves 42 and 44 provided on opposite sides of a central groove 46. The purpose of the central groove 46 is to permit flexing thereabout as previously mentioned. Wires 48 and 50 are carried in the outer grooves 42 and 44 for securing the three sections of the race together. The upper portion 12 of the pillow block has flanges 52 and 54 provided thereon which nest against the outer wall of the race 28 for securely holding the race therein. This prevents lateral movement of the race 28 within the pillow block.

In FIG. 6, the inner walls of the upper clamping portion 12 of the pillow block are chamfered as indicated by the reference characters 56 and 58 to mate with corresponding chamfered outer surfaces of the race 28. Grooves 60 and 62 are provided in the outer wall of the race 28 for accommodating wires 64 which are used for securing the sections of the race together. The race illustrated in FIG. 6 also has a centrally located groove 66 provided therein so as to permit the race to flex relative to the spherical ball 22 in order to compensate for irrgularities between the outer surface of the spherical ball 22 and the inner surface of the race 28.

In FIG. 7, the wires 64 are carried within recesses provided in the side walls of the race 28. The upper portion 12 of the pillow block has laterally extending flanges 68 provided thereon for engaging the edge of the race 28 so as to prevent lateral movement therein. The race 28 of FIG. 7 also has a centrally located groove 70 provided therein so as to permit flexing for accommodating variations or irregularities between the outer surface of the race and the inner surface of the claming member 12.

In all of the embodiments illustrated in FIGS. 1 through 7, the race is constructed in three sections such as best illustrated in FIG. 3 and the wires used for securing the three sections together have laterally extending ends which extend into laterally extending slots such as illustrated in FIG. 4.

Figure 8:
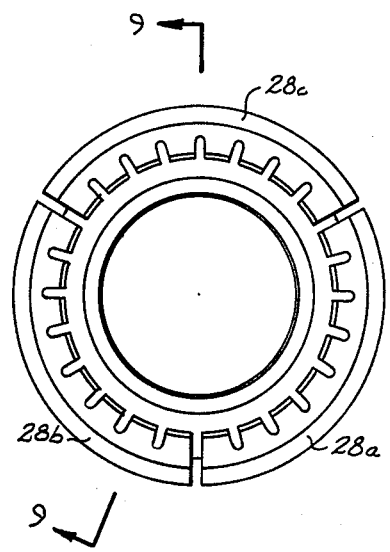
FIG. 8 is a side elevational view of still another modified spherical bearing assembly.
Figure 9:
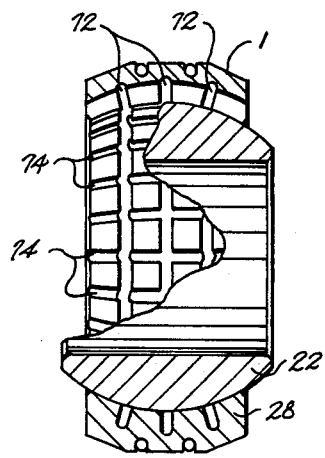
FIG. 9 is a sectional view with parts broken away for purposes of clarity taken along line 9—9 of FIG. 8.

In FIGS. 8 and 9 the wires for securing the three sections 28a, 28b and 28c of the race together are carried within grooves provided in the outer periphery of the race. There are three circumferentially extending grooves 72 provided in the inner wall of the race 28. There are also circumferentially spaced laterally extending grooves 74 provided in the inner wall of the race producing a waffle-like configuration which permits the race to flex to conform to the shape of the ball 22.

While the grooves of FIGS. 8 and 9 are illustrated as being on the inner surface of the race, it is to be understood that they could be on the outside of the race and in most embodiments such is preferable since when they are put on the inner surface, as illustrated in FIG. 8 and 9, they cut down on the surface contact between the race and the ball.

Figure 10:
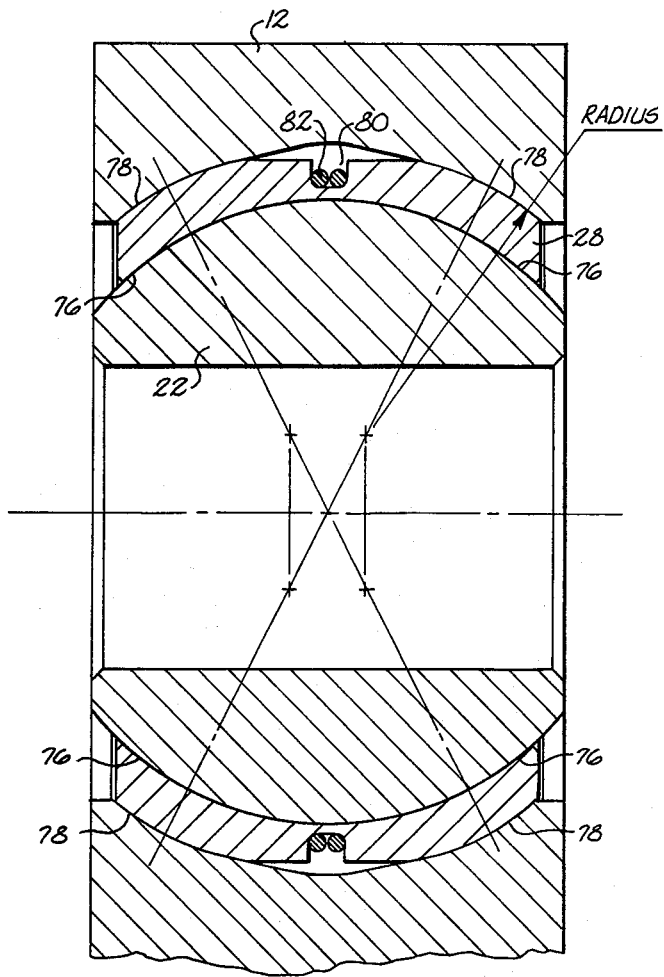
FIG. 10 is an enlarged sectional view of a pillow block assembly illustrating still another modified form of the invention.

FIG. 10 shows still another embodiment of the invention wherein the race is mounted within the pillow block 10. The curvature of the outer surface of the ball 22 and the inner surface of the race 28 as indicated at 76, is different from the curvature 78 of the outer surface of the race and the inner surface of the pillow block assembly 12. Since the curvatures at 76 and 78 are different, such prevents the race 28 from turning with respect to the pillow block. It is desired that all angular motion that takes place occur between the ball 22 and the race 28 rather than between the race 28 and the pillow block assembly 12. As can be seen, a groove 80 is provided in the race 28 so as to permit the race to flex relative to the ball. Positioned within the groove are a pair of wires 82 which extend around the race for securing the sections thereof together.

Figure 11:
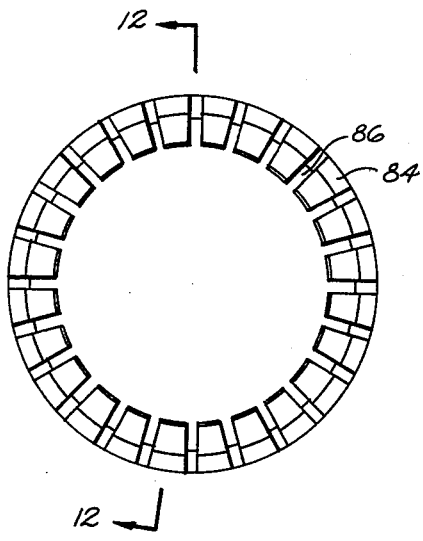
FIG. 11 is a side elevational view of a modified race forming part of the invention.
Figure 12:
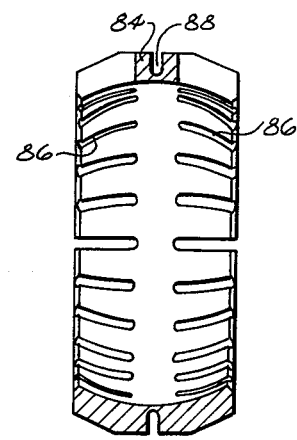
FIG. 12 is a sectional view taken along the line 12—12 of FIG. 11.

In FIGS. 11 and 12 there is illustrated a race which is constructed in a single piece that can be used with a ball to produce a bearing assembly. The race in FIGS. 11 and 12 have laterally extending slots 86 provided on the inner surface thereof which terminate short of the center of the race as illustrated in FIG. 12. By placing the circumferentially spaced slots on the inner wall of the race such increases the flexibility of the race thereby insuring maximum intimate contact between the ball and the race. A circumferentially extending groove 88 is also provided in the race 86 so as to permit additional flex as previously discussed.

Figure 13:
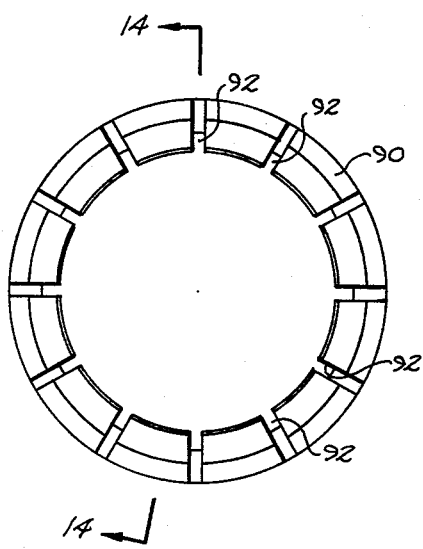
FIG. 13 is a side elevational view of still another modified race forming part of the modified form of the invention.
Figure 14:
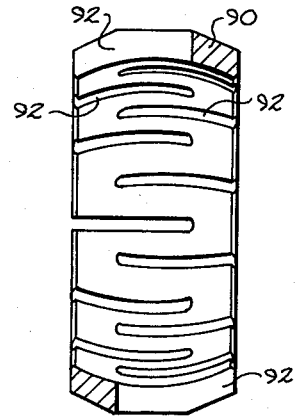
FIG. 14 is a sectional view taken along lines 14—14 of FIG. 13.

In FIG. 13, there is illustrated a race 90 having slots 92 on the inner surface thereof which extend from opposite sides of the race. The slots extend beyond the center of the race and produce interleave configuration so as best illustrated in FIG. 13. The slots permit flexing of the race so as to insure maximum contact between the inner surface of the race and the ball.

While a preferred embodiment of the invention has been described using specific terms, such description is for illustrative purposes only, and it is to be understood that changes and variations may be made without departing from the spirit or scope of the following claims.

What is claimed is:

1. A spherical bearing comprising:
   (a) an inner ball having an opening for receiving a shaft and a spherical outer surface;
   (b) a circular outer race having an inner surface that is complementary in shape with said spherical outer surface of said inner ball;
   (c) said circular outer race including a plurality of circumferentially spaced sections which extend around said inner ball snugly receiving said inner ball; and (d) a groove extending circumferentially around said race defining a thin wall portion, said thin wall portion being substantially less than 1/2 the thickness of said race, which permits flexing about said thin wall portion of the outer portions of the race relative to said ball for maximizing the physical contact between the inner surface of the race and the spherical outer surface of said ball.

2. The spherical bearing as set forth in claim 1 wherein said circular outer race includes three sections.

3. The spherical bearing as set forth in claim 2 further comprising a wire extending through said grooves around said race for securing said segments together.

4. The spherical bearing as set forth in claim 1 wherein a plurality of grooves extend circumferentially around said race of permitting flexing of the race relative to the ball.

5. A bearing assembly comprising:
(a) an inner ball having an opening for receiving a shaft and a spherical outer surface;
(b) a circular outer race having an inner surface that is complementary in shape with said spherical outer surface of said inner ball;
(c) said circular outer race including a plurality of circumferentially spaced sections which extend around said inner ball snugly receiving said inner ball;
(d) a groove extending circumferentially around said race defining a thin wall portion, said thin wall portion being substantially less than 1/2 the thickness of said race, which permits flexing about said thin wall portion of the outer portions of the race relative to said ball for maximizing the physical contact between the inner surface of the race and the spherical outer surface of said ball;
(e) a pillow block having a circular opening therein corresponding in shape with said race for carrying said race therein, an inner surface of said pillow block being chamfered; and
(f) an outer surface of said race being chamfered for mating with said chamfered surface of said pillow block for preventing movement of said race within said pillow block.

6. A bearing assembly comprising:
(a) an inner ball having an opening for receiving a shaft and a spherical outer surface;
(b) a circular outer race having an inner surface that is complementary in shape with said spherical outer surface of said inner ball;
(c) said circular outer race including a plurality of circumferentially spaced sections which extend around said inner ball snugly receiving said inner ball;
(d) a groove extending circumferentially around said race defining a thin wall portion, said thin wall portion being substantially less than ½ the thickness of said race which permits flexing about said thin wall portion of the outer portions of the race relative to said ball for maximizing the physical contact between the inner surface of the race and the spherical outer surface of said ball;
(e) a pillow block having a circular opening therein corresponding in shape with said race for carrying said race therein; and
(f) spaced radially extending flanges provided on said pillow block for holding said race within said circular opening.

* * * * *